Figure 1:
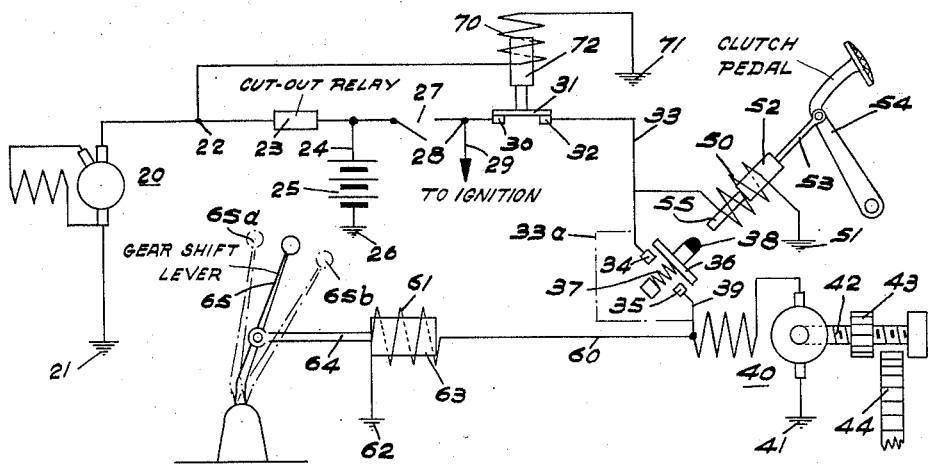

Oct. 30, 1934.                C. H. DAVIS, JR                    1,978,523
                ELECTRICAL APPARATUS FOR AUTOMOTIVE VEHICLES
                            Filed June 1, 1931

Patented Oct. 30, 1934

1,978,523

UNITED STATES PATENT OFFICE 1,978,523

ELECTRICAL APPARATUS FOR AUTOMOTIVE VEHICLES

Charles Hall Davis, Jr., Anderson, Ind., assignor, by mesne assignments, to General Motors Corporation, Detroit, Mich., a corporation of Delaware Application June 1, 1931, Serial No. 541,387

7 Claims. (Cl. 290—36)

This invention relates to electrical apparatus for an automotive vehicle and includes among its objects the provision of means for placing the vehicle transmission in the best condition for engine starting.

In the disclosed embodiments of the invention this aim is accomplished by providing devices which operate to disengage the vehicle clutch and to move the gear shift lever into neutral position whenever the starting motor is caused to operate to crank the engine. Means responsive to the self operation of the engine is provided for preventing operation of the starting motor while the engine is running and for rendering inoperative the devices which control the automobile clutch and gear shift lever.

Further objects and advantages of the present invention will be apparent from the following description, reference being had to the accompanying drawing wherein a preferred embodiment of one form of the present invention is clearly shown.

Figure 2:
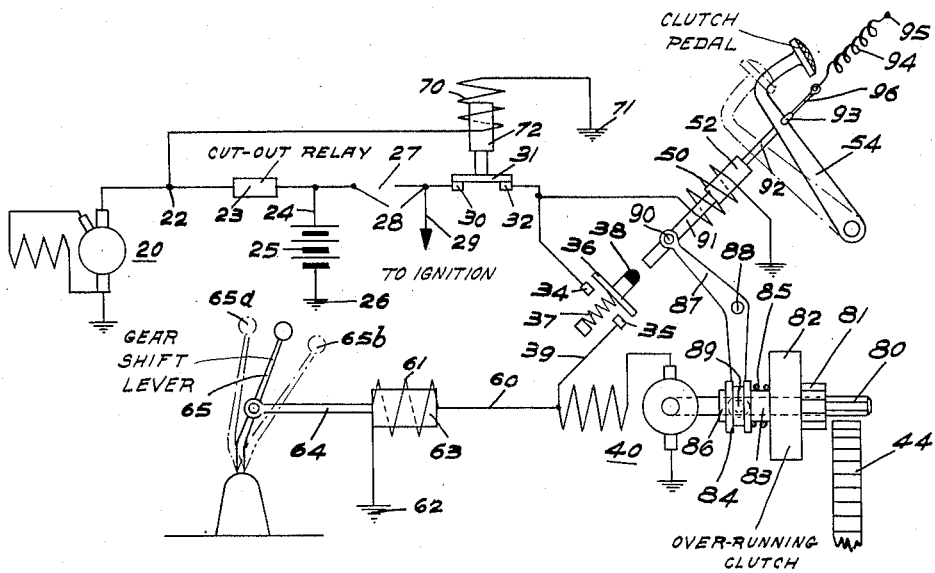

In the drawing:

Figs. 1 and 2 are wiring diagrams of the present invention.

Referring to Fig. 1, 20 designates a generator driven by the vehicle engine (not shown). The generator 20 is grounded at 21 and is connected at 22 with a cut-out relay or reverse current relay 23 which is connected by a wire 24 with a battery 25 grounded at 26.

The battery 26 is connected by a manually operated switch 27 to a terminal 28 from which a wire 29 leads to an ignition apparatus. The terminal 28 is connected with switch contact 30 bridged by movable contact 31 with a stationary contact 32, contact 32 is connected by a wire 33 with a stationary contact 34 of a starting motor switch having also a contact 35 bridged by a contact 36 normally maintained out of engagement with contacts 34 and 35 by spring 37 and having an operating button 38.

The contact 35 is connected by wire 39 with an electric motor 40 grounded at 41 and driving a screw threaded shaft 42 on which is threaded an inertia pinion 43 which moves automatically into mesh with an engine fly wheel gear 44 when the shaft 42 is rotated in a direction to cause the pinion 43 to drive the gear 44. This inertia pinion device diagrammatically represents the conventional Bendix starting motor drive.

The wire 33 is connected with an electromagnet winding 50 grounded at 51 and cooperating with a solenoid armature 52 connected by a link 53 with the automobile clutch pedal 54. It will be readily understood that when the pedal 54 is depressed the automobile clutch will be disengaged or opened in order to disconnect the engine from the transmission of the vehicle.

The wire 39 is connected by wire 60 with an electro-magnet coil 61 which is grounded at 62. The magnet winding 61 cooperates with a solenoid armature 63 which is connected by a link 64 with the automobile transmission gear shift lever 65. It will be understood that whenever the winding 61 is energized sufficiently the armature 63 will be centered with respect to the winding 61 in order to cause the gear shift lever 65 to move from either of its positions 65a or 65b into neutral position shown in full lines on the drawing.

Whenever it is desired to start the engine the operator closes the switch 27 generally known as the ignition switch since it connects with the battery 25. Current then flows to the winding 50 thru the circuit comprising wire 24, switch 27, terminal 28, switch contacts 30, 31 and 32 and wire 33. When this occurs, the armature 52 will be attracted to cause the clutch pedal 54 to be depressed in order to open the automobile clutch. Concomitantly with the movement of the clutch pedal, a rod 55 extending from the armature 52 engages the switch button 38 to cause the contact 36 to engage the contacts 34 and 35. When this occurs the battery 25 will be connected with the starting motor 40 and with the gear shift lever operating magnet winding 61. It is therefore apparent that whenever the operator closes the ignition switch 27 the automobile clutch will be disengaged, the gear shift lever will be moved into neutral position, and the starting motor will be caused to operate. The opening of the clutch and the shifting of the gear shift lever into neutral position frees the engine from the transmission in two places in order to facilitate the cranking of the engine. Of course, the engine can be freed from the transmission simply by disengaging the automobile clutch. However, it is advantageous to shift the gear shift lever into neutral position in order that, when the engine becomes self operative, the vehicle will not start to move. Therefore, the control of the gear shift lever provides a safety feature which eliminates the possibility of the vehicles starting into motion. As soon as the engine becomes self operating in case the driver has failed to move the gear shift lever into neutral position when previously stopping the engine.

In order to prevent operation of the starting motor and the electro-magnetic devices for respectively controlling the clutch and gear shift lever when the engine drives the vehicle, means responsive to engine self operation is provided for interrupting the starting motor and electro-magnet circuits. This means comprises a relay magnet 70 grounded at 71 and having one lead connected with wire 22. The magnet coil 70 when energized will attract an armature 72 connected with the contact 31. The winding 70 is so constructed that even when the engine is idling the winding 70 will receive sufficient current from the generator 20 to effect attraction of the armature 72 and the separation of the contact 31 from the contacts 32 and 30.

In the modified form of invention shown in Fig. 2, the engine starting motor operates a spline shaft 80 along which is slidable a pinion 81 adapted to mesh with the gear 44. The pinion 81 is connected by a one-way or over-running clutch 82 with the sleeve 83. The sleeve 83 is splinedly connected with the shaft 80. The sleeve 83 carries a collar 84 yieldingly pressed by a spring 85 against a shoulder 86 of the sleeve 83. The collar 84 and hence the assembly of sleeve 83 and clutch 82 and pinion 81 are shifted along the shaft 80 by a shifting lever 87 pivoted at 88 and having a stud 89 received by the grooved collar 84. The lever 87 is pivotally connected by pin 90 with a rod 91 extending from the solenoid armature 52. The armature 52 is connected with the clutch pedal 54 by a rod 92 having a hook 93 engageable with one side of the lever 54. The rod 92 is held in position shown in Fig. 2 by spring 94 connected at one end with a fixed point 95 and at the other end with a rod 96 connected with the hook 93. Like the rod 55 of Fig. 1, the rod 91 engages the button 38 of the starting motor switch.

The operation of the form of invention shown in Fig. 2 is the same in principal as the form of invention shown in Fig. 1. The chief difference is that the magnet armature 52 directly controls the shifting of the motor pinion. It is apparent that when the winding 50 attracts the armature 52 the rod 91 will be moved in a direction to cause the pinion 81 to be shifted into mesh with the engine fly wheel gear 44 and to cause the starting motor circuit to be closed by engagement to the contact 36 with contacts 34 and 35.

The hook connection between the armature 52 and the pedal 54 provided by the hook 93 on the rod 92 provides a connection such that the electromagnet will operate the clutch pedal but the clutch pedal can not be used to operate the rod 91. Therefore the operator can use the clutch pedal without effecting the shifting of the motor pinion 81 into mesh with the gear 44 while the engine is running.

It will be understood that the present invention contemplates the coordination of the control of the starting motor circuit with the control of the clutch alone, with the conrol of the gear shift lever alone, and also contemplates the coordination of the control of the starting motor circuit with the control both of the automobile clutch and the gear shift lever. The present invention contemplates the completion of the starting motor circuit by a manually operable switch alone or by using an additional switch which is closed by the electro-magnetic means which controls the vehicle clutch. It is obvious from Fig. 1 that the starting motor switch comprising elements 34 to 38 inclusive could be omitted and the wire 33 connected with the wire 39 by a wire 33a shown in dot-and-dash lines in Fig. 1.

This application is a specific modification of the disclosure of application Serial No. 562,654, which contains broad claims common to the subject matter of both applications.

While the form of embodiment of the present invention as herein disclosed, constitutes a preferred form, it is to be understood that other forms might be adopted, all coming within the scope of the claims which follow.

What is claimed is as follows:

1. In an automotive vehicle having an internal combustion engine, a clutch and transmission gearing for connecting the engine in driving relation with the vehicle, a clutch operating member and a gear shift lever for operating said transmission gearing, electrical control apparatus for controlling the operation of said vehicle and comprising, in combination, engine starting apparatus comprising an electric motor and a pinion operated by the motor and shiftable into mesh with an engine gear, means for causing the engine clutch to be disengaged and comprising an electro-magnetic device for moving the clutch operating pedal to clutch disengaging position, means for connecting said electro-magnetic means with the current source, and means operated by said electro-magnetic means for causing the electric motor to be connected with the current source and the motor pinion to be shifted into mesh with an engine gear.

2. In an automotive vehicle having an internal combustion engine, a clutch and transmission gearing for connecting the engine in driving relation with the vehicle, a clutch operating member and a gear shift lever for operating said transmission gearing, electrical control apparatus for controlling the operation of said vehicle and comprising, in combination, electric motor operated engine starting apparatus, electro-magnetic means for causing the automobile vehicle clutch to be disengaged, a current source, a manually operable switch for connecting the current source in circuit with the starting motor and clutch operating magnet and means responsive to self-operation of the engine for interrupting said circuit.

3. In an automotive vehicle having an internal combustion engine, a clutch and transmission gearing for connecting the engine in driving relation with the vehicle, a clutch operating member and a gear shift lever for operating said transmission gearing, electrical control apparatus for controlling the operation of said vehicle and comprising, in combination, electric motor operated engine starting apparatus, electro-magnetic means for causing the gear shift lever to move into neutral position, a current source, a manually operable switch for connecting the current source in circuit with the starting motor and gear shift lever operating magnet and means responsive to self-operation of the engine for interrupting said circuit.

4. In an automotive vehicle having an internal combustion engine, a clutch and transmission gearing for connecting the engine in driving relation with the vehicle, a clutch operating member and a gear shift lever for operating said transmission gearing, electrical control apparatus for controlling the operation of said vehicle and comprising, in combination, electric motor operated engine starting apparatus, electro-magnetic means for causing the automobile vehicle clutch to be disengaged, electro-magnetic means for causing the gear shift lever to move into neutral position, a current source, a manually operable switch for connecting the current source in circuit with the starting motor, the clutch operating magnet and the gear shift lever operating magnet, and means responsive to self-operation of the engine for interrupting said circuit.

5. In an automotive vehicle having an internal combustion engine, a clutch and transmission gearing for connecting the engine in driving relation with the vehicle, a clutch operating member and a gear shift lever for operating said transmission gearing, electrical control apparatus for controlling the operation of said vehicle and comprising, in combination, engine starting apparatus, means for operating said member to disengage the clutch when the engine starting apparatus is operated, and means responsive to the self-operation of the engine for preventing the operation of the starting apparatus and the operating means for said clutch operating member.

6. In an automotive vehicle having an internal combustion engine, a clutch and transmission gearing for connecting the engine in driving relation with the vehicle, a clutch operating member and a gear shift lever for operating said transmission gearing, electrical control apparatus for controlling the operation of said vehicle and comprising, in combination, engine starting apparatus, means for shifting the gear shift lever into neutral position when the engine starting apparatus is operated, and means responsive to the self-operation of the engine for preventing the operation of the starting apparatus and the gear shift lever operating means.

7. In an automotive vehicle having an internal combustion engine, a clutch and transmission gearing for connecting the engine in driving relation with the vehicle, a clutch operating member and a gear shift lever for operating said transmission gearing, electrical control apparatus for controlling the operation of said vehicle and comprising, in combination, engine starting apparatus, means for operating said member to disengage the clutch when the engine starting apparatus is operated, means for shifting the gear shift lever into neutral position when the engine starting apparatus is operated and means responsive to the self-operation of the engine for preventing the operation of the starting apparatus and the gear shift lever operating means, and the operating means for said clutch operating member.

CHARLES HALL DAVIS, Jr.